(12) United States Patent
Ohtomo et al.

(10) Patent No.: US 7,382,443 B2
(45) Date of Patent: Jun. 3, 2008

(54) DISTANCE MEASURING METHOD AND DISTANCE MEASURING DEVICE

(75) Inventors: Fumio Ohtomo, Itabashi-ku (JP); Masahiro Ohishi, Itabashi-ku (JP); Ikuo Ishinabe, Itabashi-ku (JP); Kazuhiro Shida, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/635,115

(22) Filed: Dec. 7, 2006

(65) Prior Publication Data
US 2007/0146683 A1    Jun. 28, 2007

(30) Foreign Application Priority Data
Dec. 20, 2005    (JP) .............................. 2005-366265

(51) Int. Cl.
*G01B 3/36*    (2006.01)
(52) U.S. Cl. ..................................... 356/4.01
(58) Field of Classification Search ............... 356/4.01
See application file for complete search history.

(56) References Cited

U.S. PATENT DOCUMENTS

| | | | |
|---|---|---|---|
| 5,552,893 A | 9/1996 | Akasu | 356/5.01 |
| 5,691,725 A | 11/1997 | Tanaka | 342/126 |
| 5,751,408 A * | 5/1998 | Ohtomo et al. | 356/5.14 |
| 6,710,885 B2 | 3/2004 | Ohishi et al. | 356/614 |
| 6,879,384 B2 | 4/2005 | Riegl et al. | 356/5.01 |

FOREIGN PATENT DOCUMENTS

| | | |
|---|---|---|
| EP | 1 522 870 | 4/2005 |
| JP | 2580148 | 11/1996 |
| JP | 2000-162517 | 6/2000 |
| JP | 2004-212058 | 7/2004 |

* cited by examiner

*Primary Examiner*—Thomas H. Tarcza
*Assistant Examiner*—Luke D Ratcliffe
(74) *Attorney, Agent, or Firm*—Nields & Lemack

(57) ABSTRACT

A distance measuring method for performing distance measurement by projecting a distance measuring light to an object to be measured and by receiving a reflected light, comprising: a step of projecting for scanning the distance measuring light which has at least one luminous flux with a predetermined spreading angle; a step of emitting the light by pulsed light emission at least two times during a period when the luminous flux traverses the object to be measured; a step of measuring a distance by receiving the reflected light at least two times; and a step of averaging the results of the distance measurement.

12 Claims, 8 Drawing Sheets

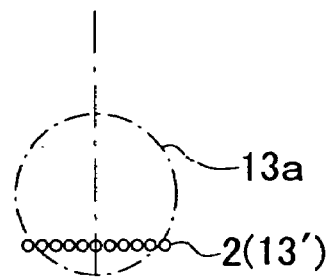
FIG.9B
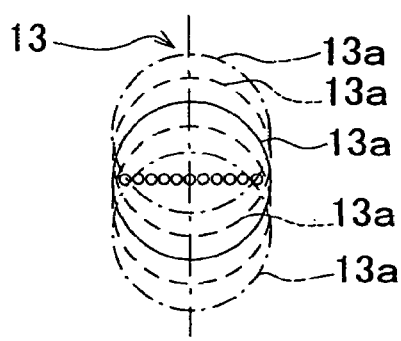
FIG.9A
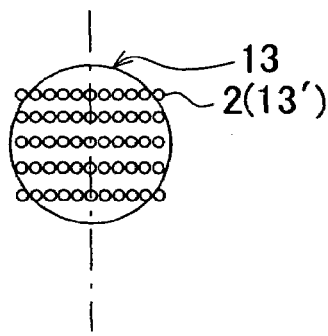
FIG.9C
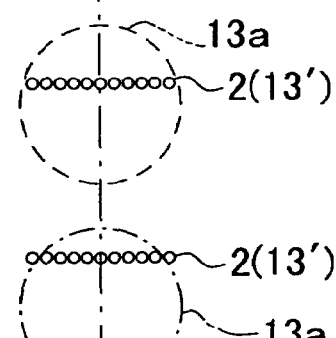
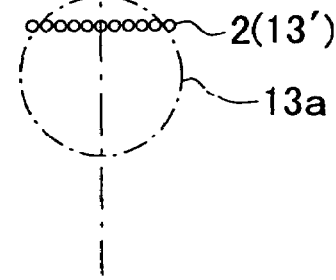

DISTANCE MEASURING METHOD AND DISTANCE MEASURING DEVICE

BACKGROUND OF THE INVENTION

The present invention relates to a distance measuring method and a distance measuring device for measuring a distance by projecting a laser beam as a distance measuring light to an object to be measured and by receiving a reflection light from the object to be measured. In particular, the present invention relates to a distance measuring method and a distance measuring device for projecting the distance measuring light for scanning.

When a distance to an object to be measured is measured by projecting a laser beam as a distance measuring light toward the object to be measured and by using a reflected light from the object to be measured, two methods are known as a distance measuring method: a collimation type electro-optical distance measuring method for performing distance measurement to the object to be measured on 1:1 basis, and a scanning type electro-optical distance measuring method for performing distance measurement by receiving a reflection light from the object to be measured while projecting a distance measuring light for scanning.

When a laser beam is emitted from a light source, there is intensity distribution normally within a light emission plane due to interference. As shown in FIG. 10, in a cross-section 3' of a distance measuring luminous flux of the laser beam, i.e. a distance measuring light 3, speckle patterns 4 occur due to the intensity distribution. Therefore, the projected distance measuring light 3 also contains speckle patterns 4 caused by the intensity distribution. For this reason, when a distance is measured according to a reflected light from the center of the luminous flux of the laser beam projected to the object to be measured or when a distance is measured according to a reflected light from the edge region of the luminous flux, difference occurs in the measured distance due to the speckle patterns.

In the collimation type electro-optical distance measuring method as described above, measurement is made by collimating the central portion of the luminous flux of the distance measuring light. As a result, it is a measurement in a fixed condition, and the measurement can be repeatedly performed. Therefore, the values of the measured distance are averaged, and this makes it possible to reduce fluctuation of the values of measured distance caused by the speckle patterns.

As disclosed in the Japanese Patent Publication No. 2580148 or in JP-A-2000-162517, the influence of the speckle pattern is eliminated by homogenizing phase unevenness and light intensity unevenness of the distance measuring luminous flux.

On the other hand, according to the scanning type electro-optical distance measuring method, the distance measuring light 3 moves with respect to the object 2 to be measured as shown in FIG. 11, and the center of the object 2 to be measured is not always at the center of the cross-section 3' of the distance measuring luminous flux. The object 2 to be measured may be in the edge region of the distance measuring luminous flux cross-section 3'. As a result, when the distance is measured, the results of the measurement may include the result of distance measurement at the center of the distance measuring luminous flux and the result of distance measurement at the edge region of the distance measuring luminous flux. FIG. 11 shows a prism for distance measurement installed on a pole 1 as an object 2 to be measured, and the distance measuring light 3 is projected to scan within a scanning surface 5.

When a distance is measured in the edge region of the distance measuring luminous flux cross-section 3', a weighted position varies when the distance measuring light is detected according to the light amount in the edge region and due to the influence of speckle patterns. As a result, deviation occurs in the timing of detection.

An electro-optical distance measuring device measures a distance according to a phase difference between a reflected distance measuring light 6 and an internal reference light or according to the time obtained from deviation in time. If there is phase deviation in the reflected distance measuring light 6, serious error may occur in the value of the measured distance.

Because the distance measuring light 3 is continuously projected for scanning, measurement cannot be repeatedly performed under condition that the object 2 to be measured is collimated, and the influence of the speckle pattern cannot be excluded. Therefore, when distance is measured by the scanning type electro-optical distance measuring method, measurement is made for one time based on partial reflection from the object to be measured of the single distance measuring luminous flux, and the measured distance value is under the influence of the speckle pattern of the distance measuring luminous flux.

Further, if the distance measuring light used for distance measurement does not have a certain predetermined light intensity, S/N ratio of the reflected light from the object to be measured is decreased, and this results in the problem of lower measurement accuracy. In case the measurement can be performed repeatedly, the measured values of the repeated measurement can be averaged, and this increases the measurement accuracy. However, in the scanning type electro-optical distance measurement with a single measuring operation, it is necessary to increase light intensity (light amount) of the distance measuring light.

SUMMARY OF THE INVENTION

It is an object of the present invention to provide a scanning type electro-optical distance measuring method and a scanning type electro-optical distance measuring device, by which it is possible to average the influence of speckle pattern on a luminous flux cross-section of a distance measuring light and to increase measurement accuracy without increasing the light intensity.

To attain the above object, the present invention provides a distance measuring method for performing distance measurement by projecting a distance measuring light to an object to be measured and by receiving the reflected light, comprising a step of projecting for scanning the distance measuring light which has at least one luminous flux with a predetermined spreading angle, a step of emitting the light by pulsed light emission at least two times during a period when the luminous flux traverses the object to be measured, a step of measuring a distance by receiving a reflected light at least two times, and a step of averaging the results of the distance measurement. Also, the present invention provides a distance measuring method for performing distance measurement by projecting a distance measuring light to an object to be measured and by receiving a reflected light, comprising a step of projecting for scanning the distance measuring light which has two or more luminous fluxes with a predetermined spreading angle overlapped on each other in a direction perpendicular to a rotating direction, a step of emitting the light by pulsed light emission at least two times during a period when the luminous flux traverses the object to be measured, a step of measuring a distance by receiving the reflected light at least two times, and a step of averaging the results of the distance measurement. Further, the present invention provides the distance measuring method as described above, wherein the number of pulsed light emissions is variable, and the number of light emissions increases with the increase of the distance to the object to be measured. Also, the present invention provides the distance measuring method as described above, wherein the pulsed light emission has a light emission frequency f and the scanning speed is a rotational angular speed $\Omega$, and the values of the light emission frequency f and the rotational angular speed $\Omega$ are set up so that the reflected light from the object to be measured is received at least two times. Further, the present invention provides the distance measuring method as described above, wherein the distance measuring light is initially projected for scanning with an initial light emission frequency f0 and an initial rotational angular speed $\Omega$0 and the reflected distance measuring light from the object to be measured is received, scanning information including at least the number of light receiving is acquired, and the light emission frequency f and the rotational angular speed $\Omega$ are set up based on scanning information. Also, the present invention provides the distance measuring method as described above, wherein the distance measuring light is projected by partial emission within a range of distance measuring light emission including the object to be measured and within a range of dummy emission before the range of light emission of the distance measuring light.

Further, the present invention provides a distance measuring device, which comprises a light emitting means for emitting a distance measuring light by pulsed light emission at a predetermined light emission frequency f, an optical system for projecting the distance measuring light with at least one luminous flux having a spreading angle $\phi$, a photodetection means for receiving a reflected distance measuring light from an object to be measured, a scanning means for projecting the distance measuring light for scanning at a rotational angular speed $\Omega$, and an arithmetic operation control unit for setting up the light emission frequency f, the spreading angle $\phi$, and the rotational angular speed $\Omega$ so that the light is emitted by pulsed light emission for two or more times during a period when the luminous flux of the distance measuring light traverses the object to be measured, and so that the photodetection means receives the reflected distance measuring light from the object to be measured two or more times, and for calculating a distance to the object to be measured based on the result of photodetection. Also, the present invention provides the distance measuring device as described above, wherein the arithmetic operation control unit controls the light emission frequency f of the light emitting means and the rotational angular speed $\Omega$ of the scanning means so that the expression $f\phi/\Omega \geq 2$ is satisfied. Further, the present invention provides the distance measuring device as described above, wherein the arithmetic operation control unit controls the light emission frequency f according to the amount of photodetection of the reflected distance measuring light received by the photodetection means. Also, the present invention provides the distance measuring device as described above, wherein the arithmetic operation control unit controls the rotational angular speed $\Omega$ according to the amount of photodetection of the reflected distance measuring light received by the photodetection means. Further, the present invention provides the distance measuring device as described above, wherein the arithmetic operation control unit judges measurement accuracy of the measured distance according to the number of photodetection of the reflected distance measuring light received by the photodetection means. Also, the present invention provides the distance measuring device as described above, wherein the optical system comprises a luminous flux splitting optical member, and the projected distance measuring light is an aggregate of split luminous fluxes. Further, the present invention provides the distance measuring device as described above, wherein the arithmetic operation control unit controls the light emitting means so that light is emitted within a range of light emission of the distance measuring light including the object to be measured and within a dummy light emission range before the range of light emission of the distance measuring light.

According to the present invention, a distance measuring method for performing distance measurement by projecting a distance measuring light to an object to be measured and by receiving the reflected light comprises a step of projecting for scanning the distance measuring light which has at least one luminous flux with a predetermined spreading angle, a step of emitting the light by pulsed light emission at least two times during a period when the luminous flux traverses the object to be measured, a step of measuring a distance by receiving the reflected light at least two times, and a step of averaging the results of the distance measurement. Also, a distance measuring method for performing distance measurement by projecting a distance measuring light to an object to be measured and by receiving the reflected light comprises a step of, projecting for scanning the distance measuring light which has two or more luminous fluxes with a predetermined spreading angle overlapped on each other in a direction perpendicular to a rotating direction, a step of emitting the light by pulsed light emission at least two times during a period when the luminous flux traverses the object to be measured, a step of measuring a distance by receiving the reflected light at least two times, and a step of averaging the results of the distance measurement. As a result, the measurement can be performed repeatedly when the distance is measured in scanning mode, and this makes it possible to increase measurement accuracy.

Also, according to the present invention, the distance measuring light is initially projected for scanning with an initial light emission frequency f0 and an initial rotational angular speed $\Omega$0 and the reflected distance measuring light from the object to be measured is received, scanning information including at least the number of light receiving is acquired, and the light emission frequency f and the rotational angular speed $\Omega$ are set up based on the scanning information. Thus, adequate values of the light emission frequency f and the rotational angular speed $\Omega$ can be set up promptly, and distance measurement can be achieved with high efficiency.

Further, according to the present invention, the distance measuring light is projected by partial emission within a range of distance measuring light emission including the object to be measured and within a range of dummy emission before the range of light emission of the distance measuring light. As a result, power consumption can be decreased.

Also, according to the present invention, the distance measuring device comprises a light emitting means for emitting a distance measuring light by pulsed light emission at a predetermined light emission frequency f, an optical system for projecting the distance measuring light with at least one luminous flux having a spreading angle $\phi$, a photodetection means for receiving a reflected distance measuring light from an object to be measured, a scanning means for projecting the distance measuring light for scanning at a rotational angular speed Ω, and an arithmetic operation control unit for setting up the light emission frequency f, the spreading angle φ, and the rotational angular speed Ω so that the light is emitted by pulsed light emission for two or more times during a period when the luminous flux of the distance measuring light traverses the object to be measured, and so that the photodetection means receives the reflected distance measuring light from the object to be measured two or more times, and for calculating a distance to the object to be measured based on the result of photodetection. As a result, measurement can be performed repeatedly when the distance is measured in scanning mode, and this makes it possible to have higher measurement accuracy.

Further, according to the present invention, the arithmetic operation control unit controls the light emission frequency f according to the amount of photodetection of the reflected distance measuring light received by the photodetection means. Also, the arithmetic operation control unit controls the rotational angular speed Ω according to the amount of photodetection of the reflected distance measuring light received by the photodetection means. Thus, it is possible to have the measurement accuracy as desired without increasing light intensity of the distance measuring light.

Also, according to the present invention, the arithmetic operation control unit judges measurement accuracy of the measured distance according to the number of photodetection of the reflected distance measuring light received by the photodetection means. Thus, the accuracy of the result of measurement can be judged adequately and, it is possible to have measurement accuracy to match the measuring condition as necessary.

Further, according to the present invention, the optical system comprises a luminous flux splitting optical member, and the projected distance measuring light is an aggregate of split luminous fluxes. As a result, the problem of speckle patterns of the light emitting means can be eliminated, and this contributes to the increase of the measurement accuracy.

Also, according to the present invention, the arithmetic operation control unit controls the light emitting means so that light is emitted within a range of light emission of the distance measuring light including the object to be measured and within a dummy light emission range before the range of light emission of the distance measuring light. Thus, power consumption can be reduced.

BRIEF DESCRIPTION OF THE DRAWINGS

FIG. 9 is a drawing to explain a relation between the split luminous fluxes and the object to be measured in the embodiment of the present invention;

DETAILED DESCRIPTION OF THE PREFERRED EMBODIMENT

Description will be given below on the best mode for carrying out the present invention referring to the attached drawings.

First, referring to FIG. 1 to FIG. 4, description will be given on general features of a scanning type distance measuring device, in which the present invention is carried out.

In an embodiment of the present invention, an object 2 to be measured is a prism for distance measurement mounted on a pole 1, which is held by an operator. A photodetection sensor device 8 for receiving a laser beam 9 for distance measurement reference plane (to be described later) is mounted on the pole 1.

Figure 1:
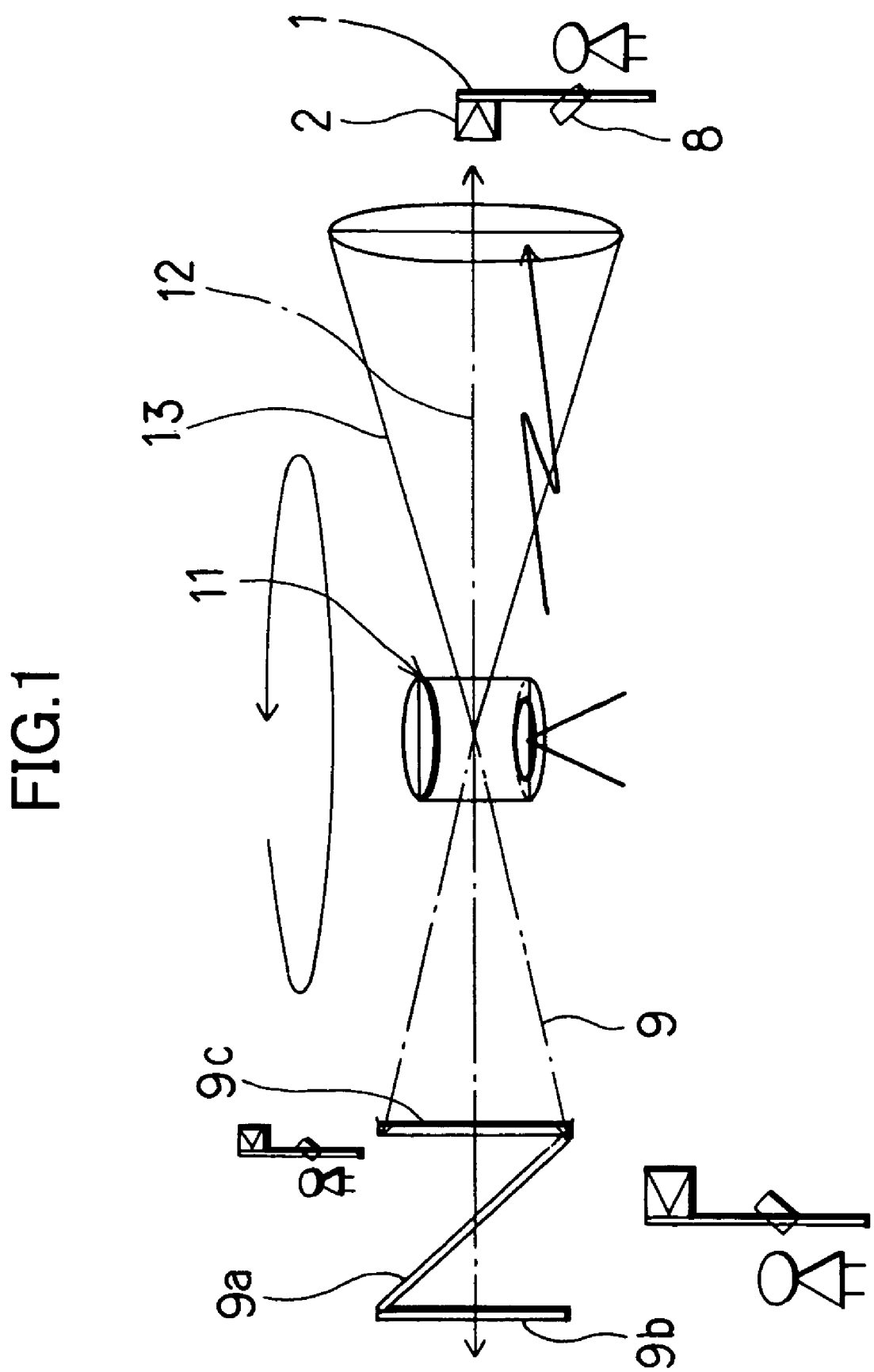
FIG. 1 is a schematical drawing to show general features of an embodiment of the present invention.

A distance measuring device 11 as shown in FIG. 1 comprises a distance measuring unit (to be described later) and a distance measurement reference plane setting unit (not shown). The distance measuring device 11 projects the laser beam 9 for distance measurement reference plane by rotary irradiation and can project a distance measuring light 13 by rotary irradiation. A horizontal reference plane 12 can be set up by the laser beam 9 for distance measurement reference plane, and distances to the objects 2 to be measured at a plurality of points can be measured by the distance measuring light 13. The distance measuring device 11 measures a distance by receiving a reflection light from the object 2 to be measured of the distance measuring light 13 projected for scanning. Thus, it is necessary that the object 2 to be measured is within a projection range of the distance measuring light 13. The distance measuring light 13 has a spreading as required in upper and lower directions.

The distance measurement reference plane setting unit forms the horizontal reference plane 12 by projecting the laser beam 9 for distance measurement reference plane, which comprises three or more fan-shaped laser beams 9a, 9b and 9c, of which at least one is tilted. As a laser device for projecting three or more fan-shaped laser beams 9a, 9b and 9c, of which one is tilted, by rotary irradiation, a rotary laser device is suggested in JP-A-2004-212058.

The laser beam 9 for distance measurement reference plane comprises a plurality of fan-shaped laser beams 9a, 9b and 9c, of which at least one is tilted, and the laser beam 9 is projected by rotary irradiation. The object 2 to be measured comprises the photodetection sensor device 8. When the photodetection sensor device 8 receives two or more fan-shaped laser beams, a time difference between the fan-shaped laser beams is obtained. As a result, based on the time difference and a tilt angle of the fan-shaped laser beam, depression and elevation angles with respect to the horizontal reference plane 12 having the distance measuring device 11 at the center are obtained. Also, based on the depression or elevation angle, the distance measurement reference plane can be set up.

Figure 2:
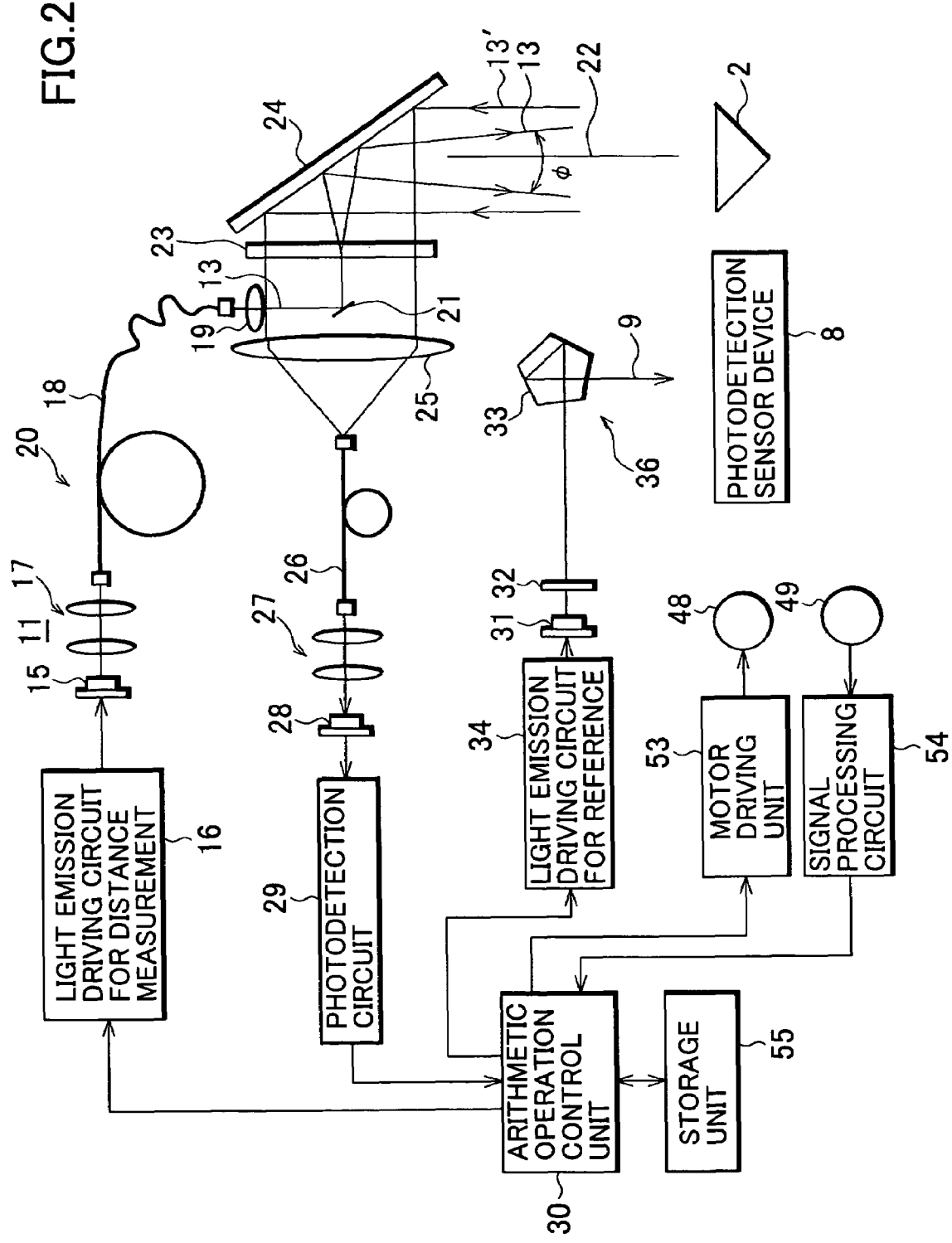
FIG. 2 is a schematical block diagram to show the embodiment of the present invention.

FIG. 2 shows general features of the distance measuring device 11 of the embodiment of the present invention.

A light emitting element 15 is a laser diode, for instance. The light emitting element 15 is driven by a light emission driving circuit 16 for distance measurement, and a laser beam is emitted by pulsed light emission at a predetermined light emission frequency f. The emitted laser beam enters an incident end surface of an optical fiber 18 for projection via a relay lens 17. The laser beam projected from the optical fiber 18 for projection is collimated by a condenser lens 19. The laser beam is then deflected by a mirror 21 and is projected on a distance measuring light optical axis 22 as the distance measuring light 13.

On the distance measuring light optical axis 22, there are provided a luminous flux splitting optical member and a first deflection optical member. The luminous flux splitting optical member is a diffraction grating 23 or an array lens which is an aggregate of small convex lenses. The first deflection optical member is a deflection mirror 24 or a prism.

Figure 3:
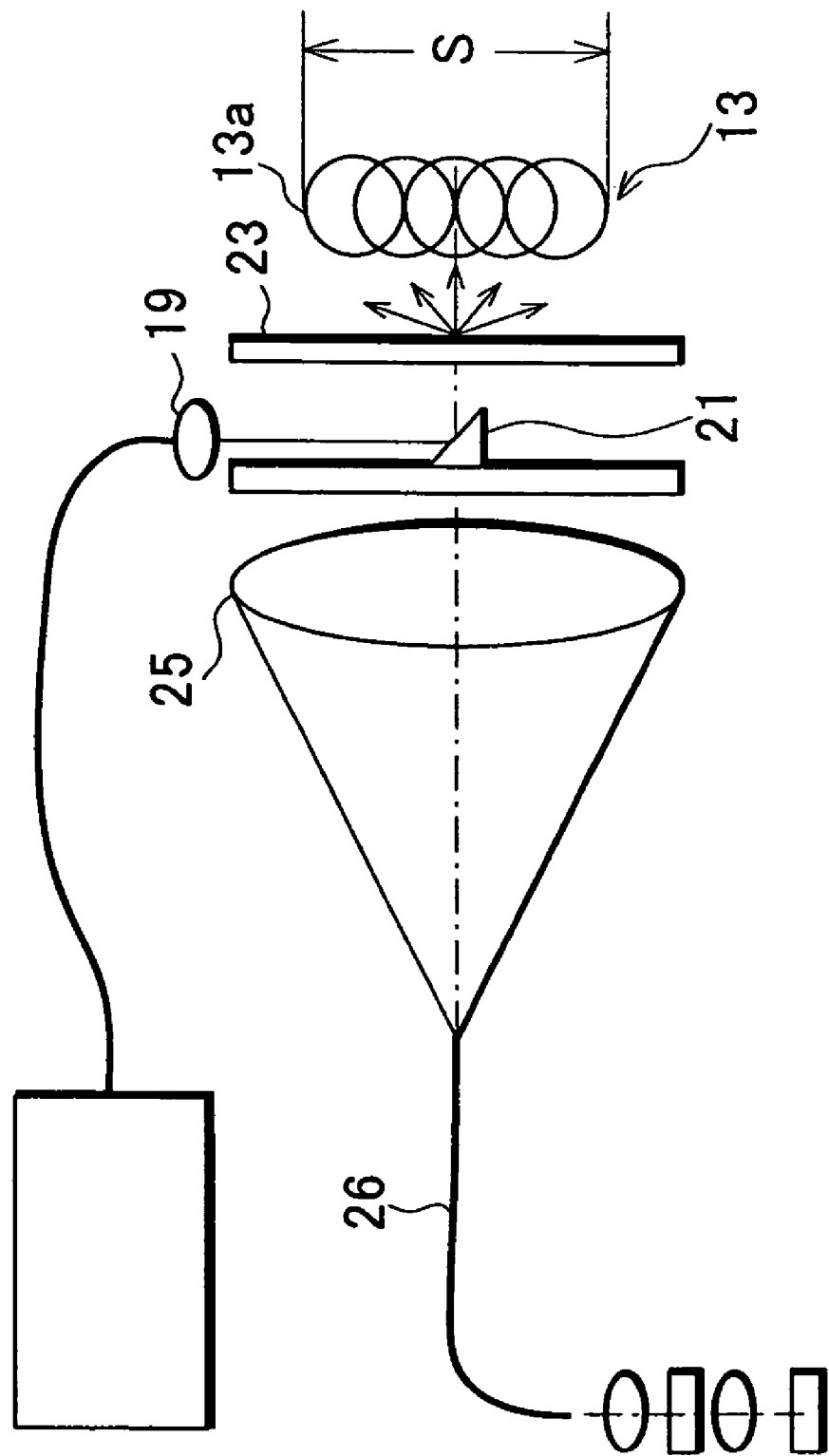
FIG. 3 is a schematical drawing of a distance measuring light projecting unit in the embodiment of the present invention.

By the diffraction grating 23, the distance measuring light 13 is split to a certain required number of luminous fluxes aligned in upper and lower directions (In FIG. 2, the direction is shown in a direction perpendicular to the distance measuring light optical axis 22.). The splitting condition is shown in FIG. 3. The distance measuring light 13 is turned to an aggregate of split luminous fluxes 13a diffracted by the diffraction grating 23. Each of the split luminous fluxes 13a has a spreading angle φ, and the adjacent split luminous fluxes 13a are overlapped on each other as required. In FIG. 3, radius portions of the split luminous fluxes 13a are overlapped on each other. The distance measuring light 13 which has been turned to an aggregate of the split luminous fluxes 13a has a spreading S as required in upper and lower directions. The spreading S determines the range of projection of the distance measuring light 13 as described above. For instance, in case the measured distance is 28 meters, the spreading S is set in such a manner that the light is projected within a range of 5 meters in upper and lower directions around the distance measuring light optical axis 22. After splitting, the distance measuring light 13 is deflected by the deflection mirror 24 so that the distance measuring light 13 is directed toward the object 2 to be measured.

A reflected distance measuring light 13' reflected by the object 2 to be measured runs along the distance measuring light optical axis 22 and enters the deflection mirror 24, and is deflected by the deflection mirror 24. The reflected distance measuring light 13' thus deflected enters an optical fiber 26 for photodetection via a condenser lens 25. The reflected distance measuring light 13' is received by a photodetection element 28 such as a photo-diode via a relay lens 27. A photodetection signal outputted from the photodetection element 28 is processed as required by a photodetection circuit 29 and the signal is inputted to an arithmetic operation control unit 30 as described later.

Although not shown in the figure, a part of the laser beam from the light emitting element 15 is split, and an internal reference light optical path is formed so that the part of the laser beam enters the photodetection element 28. An internal reference light after passing though the internal reference light optical path and the reflected distance measuring light 13' are mechanically or electrically changed over (or separated from each other), and are received by the photodetection element 28. Through comparison of the internal reference light with the reflected distance measuring light 13', a distance to the object 2 to be measured is calculated and measured.

The light emitting element 15, the light emission driving circuit for distance measurement 16, the optical fiber for projection 18, the optical fiber for photodetection 26, the photodetection element 28, the photodetection circuit 29, and the internal reference light optical path (not shown) make up together a distance measuring unit 20.

The laser beam 9 for distance measurement reference plane is emitted from a light emitting element 31 such as a laser diode. After passing through an optical member such as a diffraction grating 32, the laser beam 9 for distance measurement reference plane is split to form a plurality of fan-shaped beams, and at least one of the fan-shaped beams is tilted with respect to a horizontal plane. The fan-shaped beams are deflected in a direction parallel to the distance measuring light optical axis 22 by a second deflection optical member, e.g. a pentagonal prism 33, and the fan-shaped beams are projected as the laser beam 9 for distance measurement reference plane. The laser beam 9 for distance measurement reference plane is received by the photodetection sensor device 8. The light emitting element 31 is driven by a light emission driving circuit for reference 34. The driving conditions of the light emission driving circuit for reference 34 and the light emission driving circuit for distance measurement 16 are controlled respectively by the arithmetic operation control unit 30.

A storage unit 55 is connected with the arithmetic operation control unit 30. In the storage unit 55, there are stored a sequence program for carrying out the measurement of the distance measuring device 11, a calculation program for calculating the measured distance and the like, and a program for judging accuracy of a measurement result to match the measurement condition. Further, the results of calculation by the arithmetic operation control unit 30 are stored in the storage unit 55.

The deflection mirror 24 and the pentagonal prism 33 are held so that these can be integrally rotated by driving means as required, e.g. by a motor (to be described later). The deflection mirror 24, the pentagonal prism 33, and the driving means make up together a rotary projecting unit 36.

Figure 4:
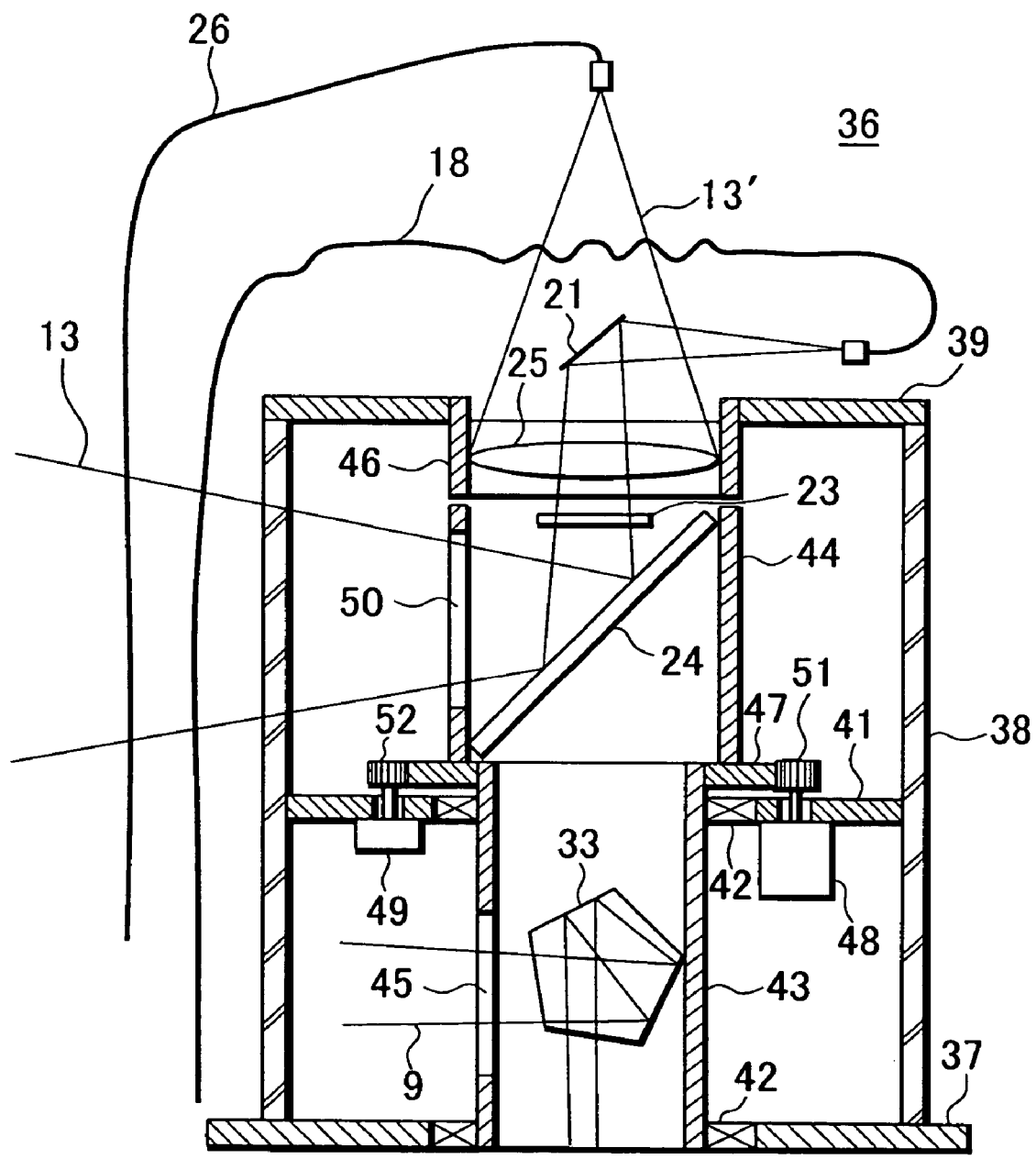
FIG. 4 is a cross-sectional view of a rotary irradiation unit in the embodiment of the present invention.

FIG. 4 shows general features of the rotary projecting unit 36 of the distance measuring device 11. In FIG. 4, the same component as shown in FIG. 1 is referred by the same symbol.

A projection window 38 in a cylindrical shape is mounted on a lower plate 37, and the projection window 38 is made of transparent glass, etc. An upper plate 39 is mounted on an upper end of the projection window 38, and an intermediate plate 41 is arranged inside the projection window 38.

A prism holder 43 in a cylindrical shape is installed on the lower plate 37 and on the intermediate plate 41 via bearings 42. The prism holder 43 is rotatably mounted around an optical axis (see FIG. 2) of the condenser lens 25. Inside the prism holder 43, there is provided the pentagonal prism 33 as a deflection optical member, and a projection window 45 for reference laser beam is arranged on a portion facing to the pentagonal prism 33 of a cylindrical surface of the prism holder 43.

The pentagonal prism 33 deflects the laser beam 9 for distance measurement reference plane after passing through the diffraction grating 32 and projects the laser beam 9 for distance measurement reference plane in a direction parallel to the distance measuring light optical axis 22.

Above the prism holder 43, a mirror holder 44 is provided integrally and concentrically with the prism holder 43. Inside the mirror holder 44, the deflection mirror 24 is held. On a portion facing to the deflection mirror 24 of a cylindrical surface of the mirror holder 44, a projection window 50 for distance measurement is provided.

A lens holder 46 is installed on the upper plate 39, and the condenser lens 25 is held by the lens holder 46. As described above, the optical axis of the condenser lens 25 is aligned with the rotation center of the mirror holder 44. Along the optical axis of the condenser lens 25, there are arranged the mirror 21 which is smaller than the diameter of the condenser lens 25 and an incident end surface of the optical fiber 26 for photodetection. On the optical axis deflected by the mirror 21, an exit end surface of the optical fiber 18 for exit is provided.

On an upper end of the prism holder 43, a scanning gear 47 is fixed. On the intermediate plate 41, there are provided a scanning motor 48 and an encoder 49. A driving gear 51 is arranged on an output shaft of the scanning motor 48, and a driven gear 52 is engaged on an input shaft of the encoder 49 respectively. The driving gear 51 and the driven gear 52 are engaged with the scanning gear 47.

When the scanning motor 48 is driven, the prism holder 43 and the mirror holder 44 are rotated. The laser beam 9 for distance measurement reference plane projected from the pentagonal prism 33 is projected by rotary irradiation and sets up a distance measurement reference plane. The distance measuring light 13 from the deflection mirror 24 is projected by rotary irradiation for the purpose of distance measurement.

The encoder 49 detects rotation angles of the pentagonal prism 33 and the deflection mirror 24. A detection signal from the encoder 49 is processed by a signal processing circuit 54 as shown in FIG. 2. After the required signal processing such as amplification, A/D conversion, etc., the signal is inputted to the arithmetic operation control unit 30. Based on the detection results of the encoder 49, the arithmetic operation control unit 30 detects a projecting direction of the laser beam 9 for distance measurement reference plane and the distance measuring light 13.

The scanning motor 48 is driven by a motor driving unit 53. The arithmetic operation control unit 30 controls the scanning motor 48 to a predetermined speed via the motor driving unit 53. For instance, based on the results of detection by the encoder 49, rotational angular speed of the prism holder 43 by the scanning motor 48 is calculated by the arithmetic operation control unit 30. Based on the results of calculation, rotation speed of the scanning motor 48 is controlled so that rotational angular speed of the prism holder 43, i.e. the scanning speed of the distance measuring light 13, is turned to the rotational angular speed $\Omega$.

When the reflected distance measuring light 13' reflected by the object 2 to be measured is received by the photodetection element 28 via the optical fiber 26 for photodetection, the angle is detected by the encoder 49, and the detected angle is stored in the storage unit 55 via the arithmetic operation control unit 30. The spreading angle $\phi$, the light emission frequency f, and the rotational angular speed $\Omega$ are stored in the storage unit 55.

The measurement by the distance measuring device 11 is carried out under the condition that the laser beam 9 for distance measurement reference plane and the distance measuring light 13 are projected, and that the prism holder 43 and the mirror holder 44 are rotated at a constant speed by the scanning motor 48.

The distance measuring light 13 projected from the optical fiber 18 for projection is continuously projected by rotary irradiation. When the light is projected to the objects 2 to be measured at a point as required, the reflected distance measuring light from the object 2 to be measured enters the deflection mirror 24 and enters the optical fiber 26 for photodetection via the condenser lens 25. The lights are received by the photodetection element 28 via the optical fiber 26 for photodetection and a distance to the object 2 to be measured is measured. Based on a signal from the encoder 49 when the light is received by the photodetection element 28, a projecting direction of the distance measuring light 13 is detected. The distance measurement result is matched with the projecting direction, and the results are stored in the storage unit 55. Because the projecting direction is detected, the object 2 to be measured which has been measured is identified at the same time.

When the laser beam 9 for distance measurement reference plane is detected by the photodetection sensor device 8, the depression or elevation angle of the object 2 to be measured with respect to the distance measuring device 11 is detected. From the measured distance of the object 2 to be measured and the depression or elevation angle, a height of the object 2 to be measured with respect to the horizontal reference plane is determined.

Figure 5:
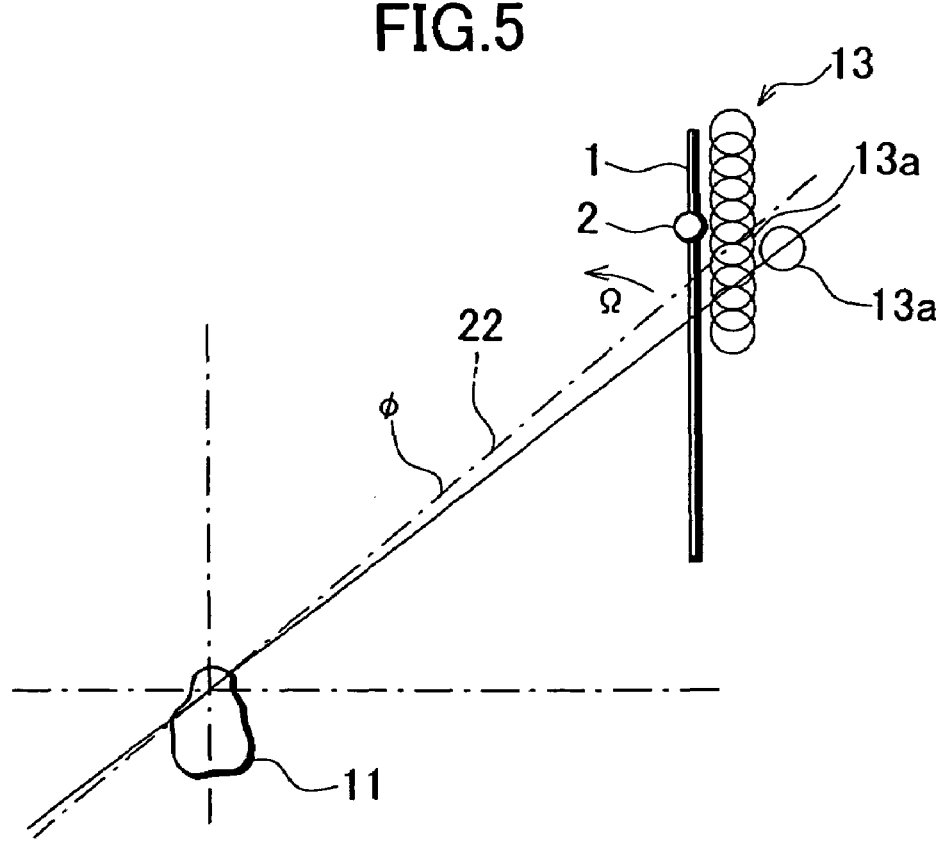
FIG. 5 is a drawing to explain a measuring condition of the embodiment of the present invention.

Now, referring to FIG. 5 to FIG. 7, description will be given below on operation of the distance measurement of the present invention. To simplify the explanation, the luminous flux in FIG. 6 and FIG. 7 shows only one of the split luminous fluxes 13a.

The distance measuring light 13 which is projected from the optical fiber 18 for projection, is split to a plurality of split luminous fluxes 13a by the diffraction granting 23, and the split luminous fluxes 13a are projected along the distance measuring light optical axis 22. Therefore, the distance measuring light 13 projected from the distance measuring device 11 is averaged by overlapping of the plurality of split luminous fluxes 13a and the distance measuring light 13 is turned to the luminous fluxes, which receive relatively lower influence from the speckle patterns. In the case of the present invention, if the distance measuring light 13 has spreading as required in upper and lower directions and has sufficiently strong light intensity, the diffraction grating 23 may not be used. Because of the overlapping of the plurality of split luminous fluxes 13a, even when there is the influence from the speckle patterns on the distance measuring light 13, the speckle patterns within the cross-sections of the luminous fluxes of the distance measuring light can be averaged (equalized) and the measurement accuracy can be improved without increasing the light intensity.

Figure 6:
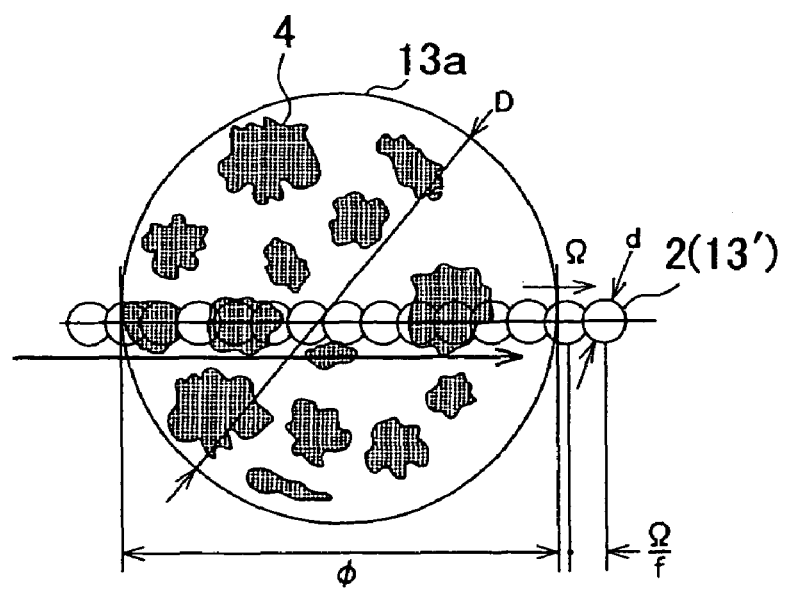
FIG. 6 is a drawing to explain a relation between a distance measuring light and an object to be measured in the embodiment of the present invention.
Figure 7:
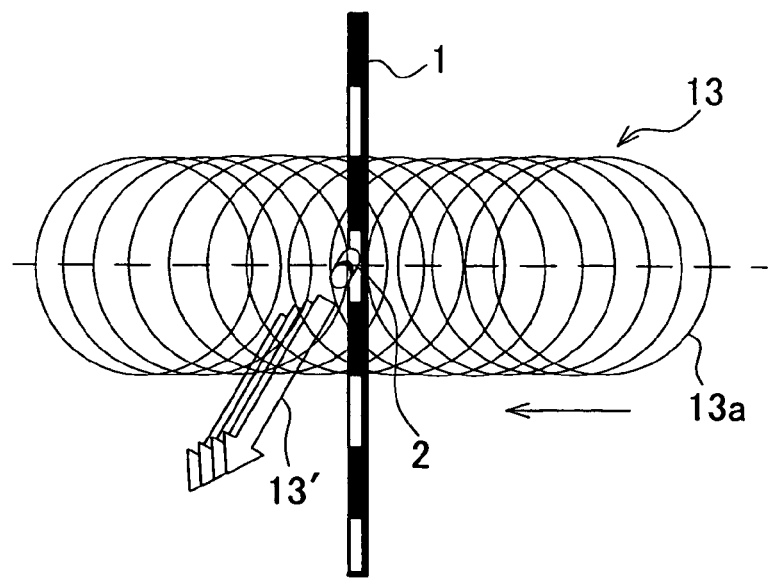
FIG. 7 is a drawing to explain a relation between the distance measuring light and the object to be measured in the embodiment of the present invention.

As described above, when the measuring light 13 is projected by rotary irradiation under the condition that the light emission frequency of the distance measuring light 13 is f, the rotational angular speed of the distance measuring light 13 is $\Omega$, and the spreading angle of the split luminous fluxes 13a is $\phi$, the relation between the object 2 to be measured and the split luminous flux 13a is as shown in FIG. 6. FIG. 6 shows relative moving relation between the object 2 to be measured and the split luminous flux 13a. A condition is shown where the split luminous flux 13a is turned on and off at the same position and the object 2 to be measured is moving at the rotational angular speed of $\Omega$.

At the position where the light is projected to the object 2 to be measured, a luminous flux of the split luminous flux 13a has a spreading cross-section with a diameter D, and the object 2 to be measured has an area with a diameter d.

The distance measuring light 13 is projected by pulsed light emission at the light emission frequency of f and is rotated at the rotational angular speed of $\Omega$, and the amount of moving (rotation angle) between pulses is $\Omega/f$ ($<\phi$). Therefore, when the distance measuring light 13 traverses the object 2 to be measured, this means that the reflected distance measuring light 13' enters the distance measuring device 11 by "n" times, where $\phi/(\Omega/f) = f\phi/\Omega = n$. A portion corresponding to a diameter "d" of the object 2 to be measured is a luminous flux of the reflected distance measuring light 13'. In this way, the distance is measured at many points in a lateral direction. As a result, the measured distance values are averaged, and this contributes to the increase of the accuracy of distance measurement.

FIG. 7 shows a case where the distance measuring light 13 projected by pulsed light emission traverses the object 2 to be measured, which is at standstill state. This shows the condition where the reflected distance measuring light 13' can be received by "n" times.

The measurement by the distance measuring device 11 is repeated by "n" times. By repeating the measurement, the measured distance values are averaged, and the distance measurement accuracy can be increased. Further, as shown in FIG. 6, the object 2 to be measured reflects the luminous fluxes at a portion with the speckle pattern and at a portion without the speckle pattern, and the influence of the speckle pattern is averaged as the result of the measurement repeated by "n" times. This makes it possible to obtain the measurement results with high accuracy.

The number of repeating "n" is correlated with the measurement accuracy. If the relation between the number of repeating "n" and the measurement accuracy is obtained in advance and is stored in the storage unit 55, the measurement accuracy when measurement is repeated by the number of "n" times can be determined. Or, if the measurement accuracy is set up to match the conditions of distance measurement, the number of repeating "n" to attain the preset measurement accuracy can be obtained.

The relation between the diameter D of the split luminous flux 13a and the diameter d of the object 2 to be measured is determined by the spreading angle $\phi$ of the split luminous flux 13a and a distance to be measured L. When the value of the spreading angle $\phi$ and the value of the distance to be measured L are increased, D>>d. The light intensity of the reflected distance measuring light 13' (i.e. the light amount of the reflected distance measuring light 13' received by the photodetection element 28) is decreased. Because the reflected distance measuring light 13' is limited to a small portion on the cross-section of the split luminous flux 13a, the influence of the speckle pattern is increased (See FIG. 6). Therefore, when the spreading angle $\phi$ and the distance to be measured L are large and when D>>d, the value of $\Omega/f$ should be made smaller. That is, the light emission frequency f should be increased and the rotational angular speed $\Omega$ should be reduced. The light emission from the light emitting element 15 should be controlled and the rotation speed of the scanning motor 48 should be controlled so that the number of repeating "n" is increased. By increasing the value of the number of repeating "n", it is possible to compensate the decrease of the photodetection amount each time. Also, when the measurement is repeated by "n" times, the reflected distance measuring lights 13' are a plurality of portions on the cross-section of the split luminous fluxes 13a. Some of the reflected distance measuring light 13' contain the speckle patterns 4 while some others do not. As a result, the speckle patterns are averaged.

When the distance to be measured L is decreased and the value of d/D increases, the light intensity of the reflected distance measuring light 13' increases, and a larger area of the luminous flux is used at a same time as the reflected distance measuring light 13'. Therefore, the influence of the speckle pattern is decreased. Thus, the number of repeating "n" can be smaller. In order to have an average effect of the results of the measurement, the light emission frequency f and the rotational angular speed $\Omega$ are preferably set to the values so that the equation $n \geq 2$ is satisfied.

By adequately controlling the values of the light emission frequency f and the rotational angular speed $\Omega$ to match the spreading angle $\phi$ and the distance to be measured L, it is possible to perform distance measurement at high accuracy without changing the light emission intensity of the light emitting element 15.

The values of the light emission frequency f and the rotational angular speed $\Omega$ may be set to fixed values to cope with the most extreme measurement condition. Or, the values of the light emission frequency f and the rotational angular speed $\Omega$ may be changed to match the distance to be measured.

Now, description will be given on operation in case where the values of the light emission frequency f and the rotational angular speed $\Omega$ are changed according to the distance to be measured.

In the storage unit 55, there are set up and inputted initial operating conditions at the start of the measurement, e.g. the light emission frequency f0 and the rotational angular speed $\Omega 0$. It is supposed that the spreading angle $\phi$ is a fixed value determined by an optical system of the distance measuring device 11 and the light emission intensity of the light emitting element 15 is a constant value.

When the measurement is started by the distance measuring device 11, the measurement is started under the initial conditions at first. That is, the measurement is made with the light emission frequency f0 of the distance measuring light 13 and with the rotational angular speed $\Omega 0$ of the distance measuring light 13.

When the distance measuring light 13 scans over the object 2 to be measured, the number of light receiving (photodetection) by the photodetection element 28 of the reflected distance measuring light 13' and the photodetection intensity of the reflection distance measuring light 13' are detected.

The arithmetic operation control unit 30 determines an adequate value of the number of measurement repeating "n" according to the photodetection intensity and changes the light emission frequency f or the rotational angular speed $\Omega$ so that the number of light receiving is turned to n. For instance, the number of measurement repeating "n" can be increased by increasing the light emission frequency f. Or, the number of measurement repeating "n" can be increased when the rotational angular speed $\Omega$ is decreased without changing the light emission frequency f. When the distance to the object 2 to be measured is increased, peripheral speed is increased. In this case, too, the light emission frequency f is increased so that the number of light emission is increased and the number of light receiving (photodetection) is turned to "n".

When adequate values of the light emission frequency f and the rotational angular speed $\Omega$ are calculated, based on the results of the calculation, the arithmetic operation control unit 30 controls the light emitting conditions of the light emitting element 15 via the light emission driving circuit for distance measurement 16 and controls the scanning motor 48 via the motor driving unit 53 so that a predetermined rotational speed is attained.

The measuring operation is carried out under the condition that the light emitting element 15 and the scanning motor 48 are controlled.

Figure 8:
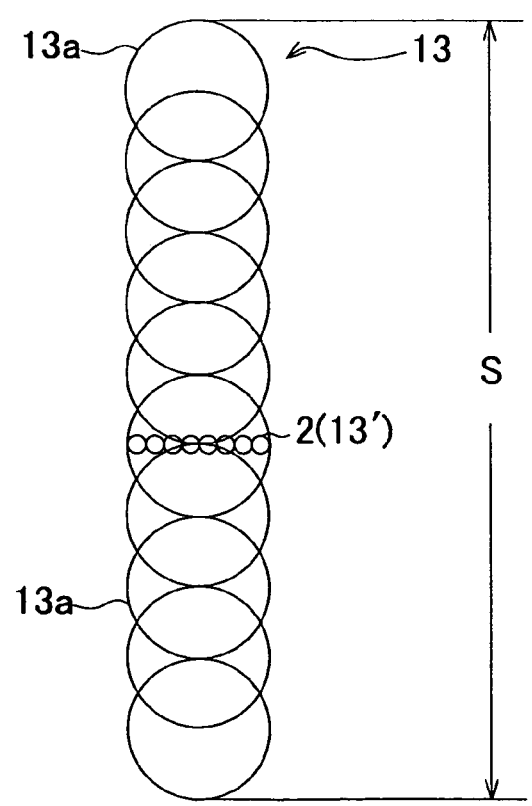
FIG. 8 is a drawing to explain a relation between split luminous fluxes and the object to be measured in the embodiment of the present invention.
Figure 10:
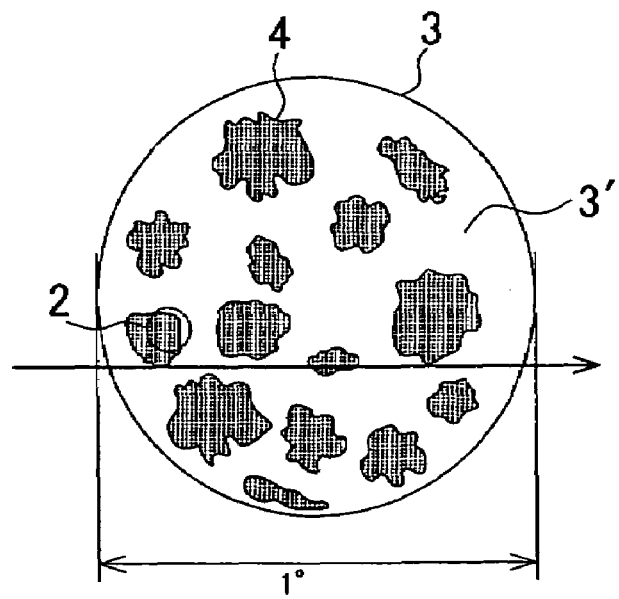
FIG. 10 is a drawing to explain a relation between a distance measuring light and the object to be measured in a conventional example.
Figure 11:
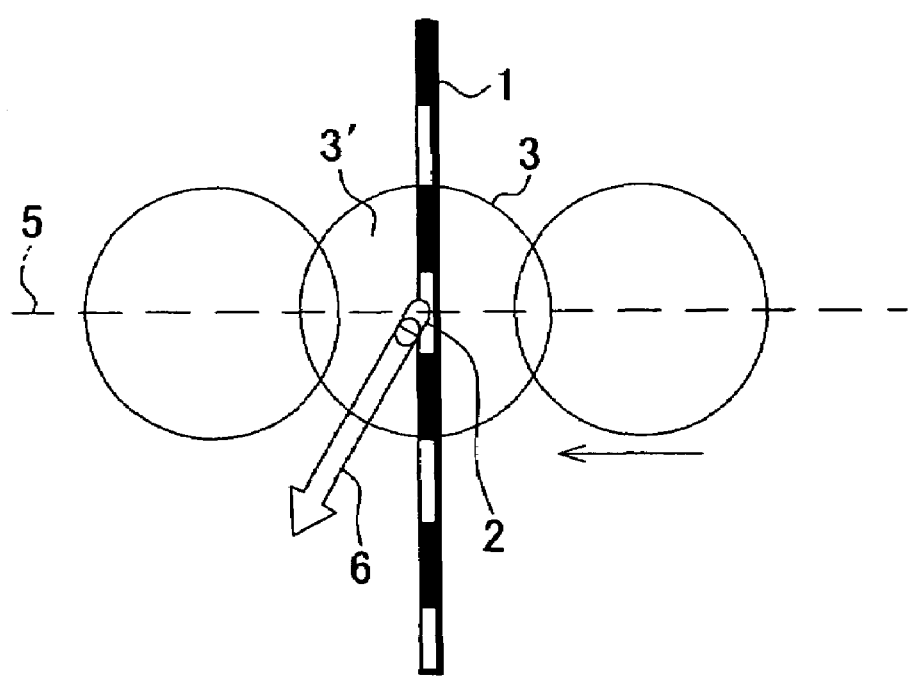
FIG. 11 is a drawing to explain a relation between the distance measuring light and the object to be measured in a conventional example.

In the above, description has been given on a single split luminous flux 13a. Now, referring to FIG. 8, description will be given on the distance measuring light 13, which is an aggregate of the split luminous fluxes 13a. In FIG. 8, the same component as in FIG. 6 is referred by the same symbol.

The distance measuring light 13 is an aggregate of the split luminous fluxes 13a aligned in an up-to-bottom direction. The split luminous fluxes 13a are overlapped on each other by the portions as necessary.

When the object 2 to be measured is within a spreading S of the distance measuring light 13, at least one of the split luminous fluxes 13a traverses the object 2 to be measured. By the object 2 to be measured, the split luminous flux 13a is reflected as the reflected distance measuring light 13'. The reflected distance measuring light 13' enters the optical fiber 26 for photodetection via the condenser lens 25 and the reflected distance measuring light 13' is received by the photodetection element 28.

FIG. 8 shows a case where the light emitting element 15 is turned on and off by 8 times when the object 2 to be measured traverses diameter portions of the split luminous fluxes 13a.

In the embodiment as given above, the distance measuring light 13 is divided in upper and lower directions by a luminous flux splitting optical member such as the diffraction grating 23, an array lens, etc. There may be provided a scanning means for reciprocally rotating the mirror 21 within a predetermined range, and reciprocal scanning may be performed so that the spreading of the distance measuring light 13 will be S.

FIG. 9 shows a case where the distance measuring light 13 comprises the split luminous fluxes 13a overlapped on each other two times or three times or more and the measurement is made as the distance measuring light 13 traverses the object 2 to be measured. FIG. 9 (A) shows distance measurement in condition that the split luminous fluxes 13a are overlapped two times or three times or more. FIG. 9 (B) shows separately the distance measuring condition of each of the overlapped split luminous fluxes 13a. FIG. 9 (C) shows the distance measuring conditions of each of the split luminous fluxes 13a by completely overlapping on each other. A plurality of reflection lights are obtained in upper and lower directions of the overlapped distance measuring luminous fluxes. As a result, the measured distance is an average of the values in upper and lower directions.

As the light emitting condition of the distance measuring light when the distance is measured, the light may be projected over total circumference or the light may be partially projected to cover only a portion within a predetermined angle including the object 2 to be measured.

In the case of partial projection, the light is projected by one turn or by several turns over total circumference at the initiation of the measurement. The position of the object 2 to be measured is detected, and a direction (position) of the partial projection and the range (angle) of distance measuring light emission is set up. Also, a dummy light emission range is arranged before the range of distance measuring light emission so that unstable light emitting condition of the light emitting element immediately after the start of the light emission does not give influence on the measurement.

By projecting the distance measuring light in the mode of partial light projection, energy can be saved, and consumption of battery can be reduced. By dummy light emission, stable measurement can be attained.

What is claimed is:

1. A distance measuring method for performing distance measurement by projecting a distance measuring light to an object to be measured and by receiving a reflected light, comprising: a step of projecting for scanning the distance measuring light by splitting the distance measuring light into two or more luminous fluxes with a predetermined spreading angle and by overlapping parts of the luminous fluxes on each other so that the luminous fluxes are lined in a direction perpendicular to a rotating direction; a step of emitting the light by pulsed light emission at least two times during a period when said distance measuring light traverses the object to be measured; a step of measuring a distance by receiving the reflected light at least two times during a period when the distance measuring light traverses the object to be measured; and a step of averaging the results of the distance measurement.

2. A distance measuring method for performing distance measurement by projecting a distance measuring light to an object to be measured and by receiving a reflected light, comprising: a step of projecting for scanning the distance measuring light which has at least one luminous flux with a predetermined spreading angle; a step of emitting the light by pulsed light emission at least two times during a period when the distance measuring light traverses the object to be measured; a step of measuring a distance by receiving the reflected light at least two times during a period when the distance measuring light traverses the object to be measured one time; and a step of averaging the results of the distance measurement; wherein the distance measuring light has a speckle pattern, and wherein the pulsed light emission has a light emission frequency f and the scanning speed is a rotational angular speed $\Omega$, and the values of the light emission frequency f and the rotational annular speed $\Omega$ are set up so that the reflected light from the object to be measured is received at least two times.

3. A distance measuring method according to claim 2, wherein the distance measuring light is projected by partial emission within a range of distance measuring light emission including the object to be measured and within a range of dummy emission before the range of light emission of the distance measuring light.

4. A distance measuring method for performing distance measurement by projecting a distance measuring light to an object to be measured and by receiving a reflected light, comprising: a step of projecting for scanning the distance measuring light by splitting the distance measuring light into two or more luminous fluxes with a predetermined spreading angle and overlapping parts of the luminous fluxes on each other so that the luminous fluxes are lined in a direction perpendicular to a rotating direction; a step of emitting the light by pulsed light emission at least two times during a period when the distance measuring light traverses the object to be measured; a step of measuring a distance by receiving the reflected light at least two times during a period when the distance measuring light traverses the object to be measured; and a step of averaging the results of the distance measurement; wherein the distance measuring light has a speckle pattern, wherein the pulsed light emission has a light emission frequency f and the scanning speed is a rotational angular speed $\Omega$, and the values of the light emission frequency f and the rotational angular speed $\Omega$ are set up so that the reflected light from the object to be measured is received at least two times.

5. A distance measuring method according to claim 2 or 4, wherein the number of pulsed light emissions is variable, and the number of light emissions increases with the increase of the distance to the object to be measured.

6. A distance measuring method according to claim 2 or 4, wherein the distance measuring light is initially projected for scanning with an initial light emission frequency f0 and an initial rotational angular speed $\Omega 0$ and the reflected distance measuring light from the object to be measured is received, scanning information including at least the number of light receiving is acquired, and said light emission frequency f and said rotational angular speed Ω are set up based on the scanning information.

7. A distance measuring device, comprising a light emitting means for emitting a distance measuring light by pulsed light emission at a predetermined light emission frequency f, an optical system for projecting the distance measuring light with at least one luminous flux having a spreading angle Φ, a photodetection means for receiving a reflected distance measuring light from an object to be measured, a scanning means for projecting the distance measuring light for scanning at a rotational angular speed Ω, and an arithmetic operation control unit for setting up said light emission frequency f, said spreading angle Φ, and said rotational angular speed Ω so that the light is emitted by pulsed light emission for two or more times during a period when the distance measuring light traverses the object to be measured, and so that said photodetection means receives the reflected distance measuring light from the object to be measured two or more times, and for calculating a distance to the object to be measured based on the result of photodetectizon, wherein said arithmetic operation control unit controls the light emission frequency f of said light emitting means and the rotational angular speed Ω of said scanning means so that the expression f Φ/Ω≧2 is satisfied.

8. A distance measuring device according to claim 7, wherein said arithmetic operation control unit controls said light emission frequency f according to the amount of photodetection of the reflected distance measuring light received by said photodetection means.

9. A distance measuring device according to claim 7, wherein said arithmetic operation control unit controls said rotational angular speed Ω according to the amount of photodetection of the reflected distance measuring light received by said photodetection means.

10. A distance measuring device according to claim 7, wherein said arithmetic operation control unit judges measurement accuracy of the measured distance according to the number of photodetection of the reflected distance measuring light received by said photodetection means.

11. A distance measuring device according to claim 7, wherein said optical system comprises a luminous flux splitting optical member, and the projected distance measuring light is an aggregate of split luminous fluxes.

12. A distance measuring device, comprising a light emitting means for emitting a distance measuring light by pulsed light emission at a predetermined light emission frequency f, an optical system for projecting the distance measuring light with at least one luminous flux having a spreading angle Φ, a photodetection means for receiving a reflected distance measuring light from an object to be measured, a scanning means for projecting the distance measuting light for scanning at a rotational angular speed Ω, and an arithmetic operation control unit for setting up said light emission frequency f, said spreading angle Φ, and said rotational angular speed Ω so that the light is emitted by pulsed light emission for two or more times during a period when the distance measuring light traverses the object to be measured, and so that said photodetection means receives the reflected distance measuring light from the object to be measured two or more times, and for calculating a distance to the object to be measured based on the resut of photodetection, wherein said arithmetic operation control unit controls said light emitting means so that the light is emitted within a range of light emission of the distance measuring light including the object to be measured and within a dummy light emission range before the range of light emission of the distance measuring light.

* * * * *